United States Patent
Lee et al.

(10) Patent No.: US 9,997,789 B2
(45) Date of Patent: Jun. 12, 2018

(54) LITHIUM PRIMARY BATTERY USING COMPOSITE ELECTROLYTE

(71) Applicant: VITZROCELL CO., LTD., Chungcheongnam-do (KR)

(72) Inventors: Chae-Bong Lee, Asan-si (KR); Hyen-Woo Jung, Chungcheongnam-do (KR); Sang-Choul Park, Chungcheongnam-do (KR); Sung-Hoon Jung, Chungcheongnam-do (KR); Kyu-Byoung Yoon, Daejeon (KR)

(73) Assignee: VITZROCELL CO., LTD., Chungcheongnam-do (KR)

( * ) Notice: Subject to any disclaimer, the term of this patent is extended or adjusted under 35 U.S.C. 154(b) by 203 days.

(21) Appl. No.: 15/107,920

(22) PCT Filed: Jan. 15, 2015

(86) PCT No.: PCT/KR2015/000438
§ 371 (c)(1),
(2) Date: Jun. 24, 2016

(87) PCT Pub. No.: WO2015/130009
PCT Pub. Date: Sep. 3, 2015

(65) Prior Publication Data
US 2016/0322647 A1    Nov. 3, 2016

(30) Foreign Application Priority Data

Feb. 26, 2014   (KR) .................. 10-2014-0022333

(51) Int. Cl.
| | | |
|---|---|---|
| H01M 6/24 | (2006.01) | |
| H01M 4/36 | (2006.01) | |
| H01M 4/38 | (2006.01) | |
| H01M 4/587 | (2010.01) | |
| H01M 6/14 | (2006.01) | |
| H01M 4/583 | (2010.01) | |
| H01M 6/50 | (2006.01) | |

(52) U.S. Cl.
CPC ............. *H01M 6/24* (2013.01); *H01M 4/368* (2013.01); *H01M 4/382* (2013.01); *H01M 4/583* (2013.01); *H01M 4/587* (2013.01); *H01M 6/14* (2013.01); *H01M 6/5044* (2013.01); *H01M 2300/002* (2013.01)

(58) Field of Classification Search
CPC ................................. H01M 6/24; H01M 6/14
See application file for complete search history.

(56) References Cited

FOREIGN PATENT DOCUMENTS

| KR | 1020010104540 A | 11/2001 |
|---|---|---|
| KR | 1020050010134 A | 1/2005 |
| KR | 100945203 B1 | 3/2010 |

(Continued)

OTHER PUBLICATIONS

European Search Report dated Feb. 1, 2017 for European Application No. 15754849.6-1373.

(Continued)

*Primary Examiner* — Olatunji Godo
(74) *Attorney, Agent, or Firm* — Hauptman Ham, LLP

(57) ABSTRACT

Disclosed is a lithium primary battery using a composite electrolyte, wherein, in order to maximize advantages of a lithium thionyl battery and a lithium sulfonyl battery, electrolytes of the two batteries are mixed to proceed two-stage discharging, thereby making it possible to check the battery usage.

8 Claims, 4 Drawing Sheets

(56) References Cited

FOREIGN PATENT DOCUMENTS

KR          101112688 B1    9/2011

OTHER PUBLICATIONS

W. P. Kilroy et al., "Lithium Batteries Utilizing SOCl2—SO2Cl2 Mixed Electrolytes", Journal of Power Sources, 36, Oct. 1991, No. 1, Lausanne, CH, pp. 1-10.
K. M. Abraham et al., "Lithium-Inorganic Electrolyte Cells Exhibiting Improved Low Temperature Performance", EIC Laboratories, Incorporated, Norwood, Massachusetts 02062, vol. 134, No. 1, pp. 258-259.
Mark M. Morrison et al., "Studies in Lithium Oxyhalide Cells for Downhole Instrumentation Use of Lithium Tetrachlorogallate Electrolyte in LiSOCl2 Cells", Journal of Power Sources, 45, Jul. 1993, No. 3, Lausanne, CH, pp. 343-352.
A. J. Hills et al., "The Li—SoCl2 Cell—A Review", Journal of Power Sources, 24, Nov. 1988, No. 4, Lausanne, CH, pp. 253-271.
Kwang Chul Roh et al., "The Study of Evaluation Methods of Electrolyte for Li/SO2Cl2 Battery", Appl. Chem. Eng., Feb. 2011, vol. 22, No. 1, 5 pages.
International Search Report dated Apr. 16, 2015 corresponding to European Patent Application No. PCT/KR2015/000438.

LITHIUM PRIMARY BATTERY USING COMPOSITE ELECTROLYTE

CROSS REFERENCE TO RELATED APPLICATION

This application claims the priority of Korean Patent Application No. 10-2014-0022333, filed on Feb. 26, 2014 in the KIPO (Korean Intellectual Property Office). Further, this application is the National Phase application of International Application No. PCT/KR2015/000438 filed Jan. 15, 2015, which designates the United States and was published in Korean.

TECHNICAL FIELD

The present invention relates to a lithium primary battery, and more particularly, to a lithium primary battery using a composite electrolyte, wherein, in order to maximize advantages of a lithium thionyl battery and a lithium sulfonyl battery, electrolytes of the two batteries are mixed to proceed two-stage discharging, thereby making it possible to check the battery usage.

BACKGROUND ART

A lithium thionyl (Li/SOCl$_2$) battery has characteristics such as a high operation voltage of 3.5 V, a high capacity, and a low self-discharging rate of less than 1% per year, and a freezing point of a thionyl (SOCl$_2$) electrolyte is −105° C., which allows the battery to be used within a broad range of temperature from −55° C. to 85° C. Thus, the lithium thionyl battery has been used as a primary battery power source of a device that requires characteristics of long-term use for 10 years or more, but the battery has a disadvantage of rapid battery capacity decrease under the condition of a high current.

On the contrary, although a driving voltage of the lithium sulfonyl (Li/SO$_2$Cl$_2$) battery is about 3.8 V, which has an advantage of maintaining a discharging capacity under the conditions of a driving voltage and a current higher than those of a lithium thionyl (Li/SOCl$_2$) battery, rapid capacity decrease may occur at a low temperature due to a physical property, where a freezing point of a sulfonyl (SO$_2$Cl$_2$) electrolyte is −54° C., and thus environment for using the battery is limited by a temperature range of −20° C. to 85° C.

Also, since voltages of the lithium thionyl (Li/SOCl$_2$) battery and the lithium sulfonyl (Li/SO$_2$Cl$_2$) battery are very constant during a charging process, a remaining capacity of the batteries during the use may not be checked, and thus the time for battery replacement may not be exactly recognized.

The related prior documents include Korean Patent No. 2001-0104540 (published on Nov. 26, 2001), which discloses a lithium primary battery.

DISCLOSURE

Technical Problem

It is an aspect of the present invention to provide a lithium primary battery using a composite electrolyte, wherein, in order to maximize advantages of a lithium thionyl battery and a lithium sulfonyl battery, electrolytes of the two batteries are mixed to proceed two-stage discharging, thereby making it possible to check the battery usage.

Technical Solution

In accordance with one aspect of the present invention, a lithium primary battery using a composite electrolyte has a bobbin shape and includes a lithium anode including a metal lithium; a cathode including a carbon powder; and the composite electrolyte that is contained in a battery case, wherein the composite electrolyte is prepared by mixing a sulfonyl (SO$_2$Cl$_2$) electrolyte and a thionyl (SOCl$_2$) electrolyte, and a weight ratio of the sulfonyl (SO$_2$Cl$_2$) electrolyte to the thionyl (SOCl$_2$) electrolyte in the composite electrolyte ranges from 6:4 to 9:1, wherein the lithium primary battery is characterized in having two stage discharging voltages, which are a battery voltage maintained at 3.8V±0.2V by the sulfonyl (SO$_2$Cl$_2$) electrolyte during an initial operation and then a battery voltage maintained at 3.5V±0.2V by the thionyl (SOCl$_2$) electrolyte, thereby making it possible to check a remaining capacity of the battery in use.

Advantageous Effects

According to the present invention, a lithium primary battery using a composite electrolyte uses the composite electrolyte prepared by mixing electrolytes of a lithium sulfonyl (Li/SO$_2$Cl$_2$) battery and a lithium thionyl (Li/SOCl$_2$) battery to proceed stage-wise discharging including maintaining a battery voltage at 3.8 V by the sulfonyl (SO$_2$Cl$_2$) electrolyte during an initial operation, and then maintaining a battery voltage at 3.5 V by the thionyl (SOCl$_2$) electrolyte after consuming the sulfonyl (SO$_2$Cl$_2$) electrolyte, thereby making it possible to check the battery usage.

Also, the lithium primary battery using a composite electrolyte according to the present invention has two-stage discharging voltages, which makes it possible to check a remaining capacity of the battery in use, and thus the time for battery replacement may be recognized as well as a problem of rapid capacity decrease at a low temperature, which is a disadvantage of a lithium sulfonyl (Li/SO$_2$Cl$_2$) battery, may be supplemented while improving a discharging capacity, which is another disadvantage of a lithium sulfonyl (Li/SO$_2$Cl$_2$) battery.

BEST MODE

Figure 1:
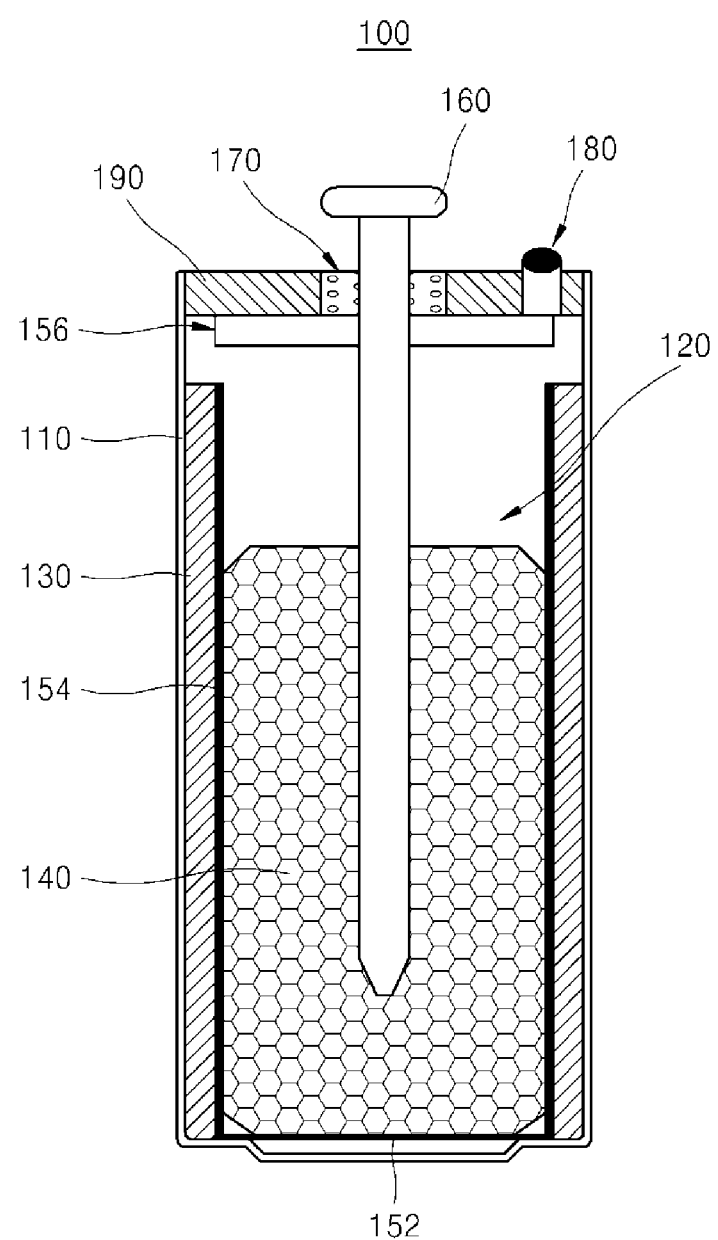
FIG. 1 is a cross-sectional view of a lithium primary battery using a composite electrolyte according to an embodiment of the present invention.

The advantages and features of the present disclosure and methods for achieving these will be clarified in detail through embodiments described hereinafter in conjunction with the accompanying drawings. However, embodiments of the present invention may, however, be implemented in many different forms and should not be construed as being limited to the embodiments set forth herein. Rather, these embodiments are provided so that this disclosure will be thorough and complete, and will fully convey the scope of the invention to those skilled in the art and are defined by the claim coverage of the present invention. Throughout the specification, the same reference numerals will be used to designate the same or like components.

Hereinafter, a lithium primary battery using a composite electrolyte according to a preferable embodiment of the present invention will be described in detail with reference to the accompanying drawing.

FIG. 1 is a cross-sectional view of a lithium primary battery 100 using a composite electrolyte according to an embodiment of the present invention.

Referring to FIG. 1, the lithium primary battery 100 using a composite electrolyte according to an embodiment of the present invention may be of a battery type having a bobbin structure that includes a battery case 110, a composite electrolyte 120, a lithium anode 130, a cathode 140, and a header pin 160, but it is not limited thereto.

Although not shown in detail in the drawing, the lithium primary battery 100 using a composite electrolyte according to an embodiment of the present invention may be of a battery type having a spiral structure that is prepared by winding the lithium anode 130 and the cathode 140 in a jelly-roll shape, and the composite electrolyte 120 may be used the same in this case.

The composite electrolyte 120 is contained in the battery case 110. Here, the composite electrolyte 120 is prepared by mixing a sulfonyl ($SO_2Cl_2$) electrolyte and a thionyl ($SOCl_2$) electrolyte. A core of the present invention is using the composite electrolyte 120, and the detailed description thereof will be provided later in the specification.

The lithium anode 130 having a bobbin shape is attached on an inner wall of the battery case 110. Here, the lithium primary battery 100 having a bobbin shape is prepared by attaching the lithium anode 130 on the inner wall of the battery case 110, inserting each of a lower insulator 152 and a side-wall insulator 154 into the battery case 110, additionally inserting the lithium anode 130 and an upper insulator 156, inserting the header pin 160 to an insulating plate 190 bound to glass 170 to adhere to the battery case 110, and then welding the resultant.

Thereafter, the composite electrolyte 120 is contained in the battery case 110, and then the battery case 110 is finally sealed by welding with SUS balls 180, as a finishing material.

Here, the cathode 150 may be formed of a material including carbon and a binder, and polytetrafluoroethylene (PTFE) may be used as the binder, but it is not limited thereto.

The lithium primary battery 100 using a composite electrolyte according to an embodiment of the present invention is characterized in using a mixture of the sulfonyl ($SO_2Cl_2$) electrolyte and the thionyl ($SOCl_2$) electrolyte as the composite electrolyte 120. Here, the composite electrolyte 120 may be prepared by adding the thionyl ($SOCl_2$) electrolyte to the sulfonyl ($SO_2Cl_2$) electrolyte. On the other hand, the composite electrolyte 120 may be prepared by adding the sulfonyl ($SO_2Cl_2$) electrolyte to the thionyl ($SOCl_2$) electrolyte.

The composite electrolyte 120 may preferably use the mixture including mixture of the sulfonyl ($SO_2Cl_2$) electrolyte and the thionyl ($SOCl_2$) electrolyte at a weight ratio ranging from 6:4 to 9:1. Here, when a remaining amount of a discharging capacity after using 60%, 70%, 80%, and 90% are to be checked, compositions of the composite electrolyte 120 may be prepared as $SO_2Cl_2$ 60%+$SOCl_2$ 40%, $SO_2Cl_2$ 70%+$SOCl_2$ 30%, $SO_2Cl_2$ 80%+$SOCl_2$ 20%, and $SO_2Cl_2$ 90%+$SOCl_2$ 10%, respectively.

When a weight ratio of the sulfonyl ($SO_2Cl_2$) electrolyte and the thionyl ($SOCl_2$) electrolyte is lower than 6:4, a problem of rapid decrease in a battery capacity may occur under a high current condition due to a relatively increased amount of the thionyl electrolyte. On the contrary, when a weight ratio of the sulfonyl ($SO_2Cl_2$) electrolyte and the thionyl ($SOCl_2$) electrolyte is higher than 9:1, an amount of the thionyl electrolyte is insignificant, and thus a remaining amount of the battery may be checked, but low-temperature characteristics may relatively deteriorate.

Here, a lithium salt used in the composite electrolyte 120 may be formed of at least one selected from lithium aluminum chloride ($LiAlCl_4$) and lithium gallium chloride ($LiGaCl_4$), and a concentration of the lithium salt may be preferably in a range of 0.1 M to 3.0 M.

In particular, it was confirmed that the lithium primary battery 100 using a composite electrolyte according to an embodiment of the present invention undergoes a two-stage discharging process that includes maintaining a battery voltage at 3.8±0.2V by the sulfonyl ($SO_2Cl_2$) electrolyte during an initial operation and maintaining a battery voltage at 3.5±0.2V by the thionyl ($SOCl_2$) electrolyte.

As described above, according to an embodiment of the present invention, a lithium primary battery using a composite electrolyte uses the composite electrolyte prepared by mixing electrolytes of a lithium sulfonyl (Li/$SO_2Cl_2$) battery and a lithium thionyl (Li/$SOCl_2$) battery to proceed stage-wise discharging including maintaining a battery voltage at 3.8 V by the sulfonyl ($SO_2Cl_2$) electrolyte during an initial operation, and then maintaining a battery voltage at 3.5 V by the thionyl ($SOCl_2$) electrolyte after consuming the sulfonyl ($SO_2Cl_2$) electrolyte, thereby making it possible to check the battery usage.

Also, the lithium primary battery using a composite electrolyte according to the present invention has two-stage discharging voltages, which makes it possible to check a remaining capacity of the battery in use, and thus the time for battery replacement may be recognized as well as a problem of rapid capacity decrease at a low temperature, which is a disadvantage of a lithium sulfonyl (Li/$SO_2Cl_2$) battery, may be supplemented while improving a discharging capacity, which is another disadvantage of a lithium sulfonyl (Li/$SO_2Cl_2$) battery.

EXAMPLE

Hereinafter, features and functions of the present invention will be described in greater detail with reference to examples of the present invention. However, it is to be understood that the examples are provided herein for illustrative purposes only and should not be construed as limiting the present invention in any fashion.

Contents that are not described herein are descriptions that may be technically derived by those of ordinary skill in the art, and thus the descriptions are omitted.

1. Preparation of Lithium Primary Battery

Lithium primary batteries according to Example 1 and Comparative Examples 1 and 2 were prepared under the conditions of electrolyte compositions and lithium salt concentrations shown in Table 1.

TABLE 1

|  | Electrolyte | Lithium salt concentration |
|---|---|---|
| Example 1 | 70% of $SO_2Cl_2$ + 30% of $SOCl_2$ | 1M $LiAlCl_4$ |
| Comparative Example 1 | 100% of $SOCl_2$ | 1M $LiAlCl_4$ |
| Comparative Example 2 | 100% of $SO_2Cl_2$ | 1M $LiAlCl_4$ |

2. Evaluation of Discharging Characteristics

Table 2 shows the results of evaluation of discharging characteristics of the lithium primary batteries according to Example 1 and Comparative Examples 1 and 2. Also, FIG. 2 is a view representing the results of discharging characteristic tests performed on the batteries prepared according to Example 1 and Comparative Examples 1 and 2 under the conditions including 20° C. and a current at an intensity of 1 mA/cm².

TABLE 2

|  | Discharging time | | | |
|---|---|---|---|---|
|  | 20° C., 1 mA/cm² | 20° C., 5 mA/cm² | −30° C., 1 mA/cm² | Voltage characteristics |
| Example 1 | 212 hours | 53 hours | 95 hours | Two stage voltage |
| Comparative Example 1 | 212 hours | 28 hours | 85 hours | One stage voltage |
| Comparative Example 2 | 212 hours | 57 hours | 64 hours | One stage voltage |

Figure 2:
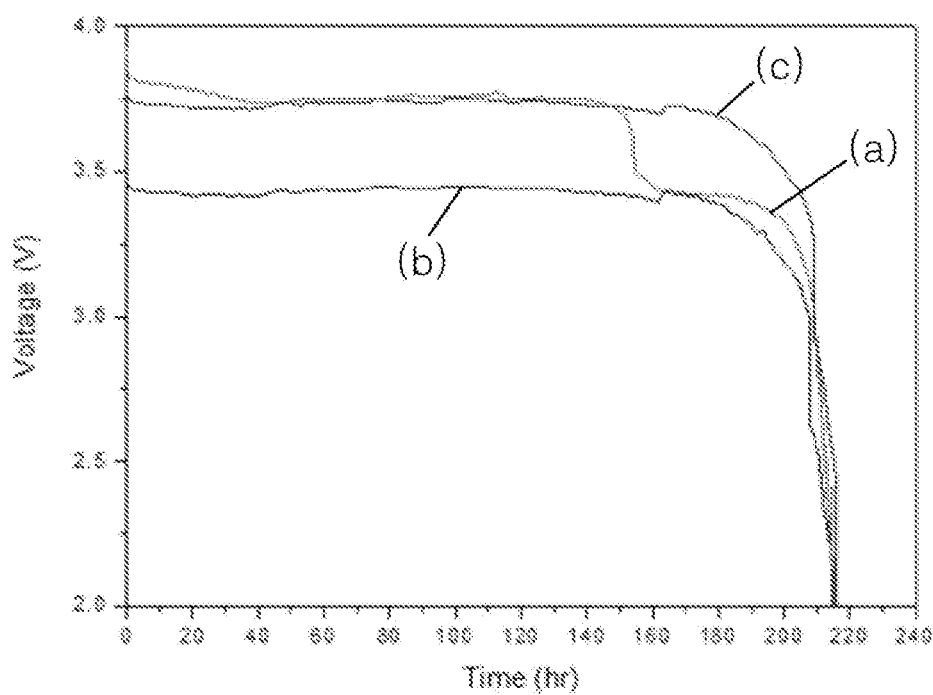
FIG. 2 is a view representing the results of discharging characteristic tests performed on batteries prepared according to Example 1 and Comparative Examples 1 and 2 under the conditions including 20° C. and a current at an intensity of 1 mA/cm$^2$.

Referring to Tables 1 and 2 and FIG. 2, it may be confirmed that the lithium primary battery according to Example 1 using the composite electrolyte including 70% of $SO_2Cl_2$+30% of $SOCl_2$ exhibited graph characteristics of a driving voltage of about 3.8 V, which is one characteristic of a $SO_2Cl_2$ battery, until about 70% of a discharging capacity was consumed from the beginning of the discharging process. Then, after performing the discharging process, the battery underwent stage-wise discharging at a voltage of 3.4 V, which is one characteristic of a $SOCl_2$ battery, and the process ended.

On the other hand, it may be confirmed that the lithium thionyl (Li/$SOCl_2$) battery according to Comparative Example 1 using an electrolyte of 100% $SOCl_2$ exhibited a constant voltage of 3.4 V until the discharging process ended as a characteristic of a general discharging process.

Also, it may be confirmed that the lithium sulfonyl (Li/$SO_2Cl_2$) battery according to Comparative Example 2 using an electrolyte of 100% $SO_2Cl_2$ exhibited a constant voltage of 3.8 V until the discharging process ended as a characteristic of a general discharging process.

Therefore, the lithium primary battery according to Example 1 had a voltage difference per stage during the discharging process due to the use of the composite electrolyte having a composition of 70% of $SO_2Cl_2$+30% of $SOCl_2$, and thus it has been made possible to check a remaining capacity of the battery when the usage of the battery was about 70%.

In particular, as shown in Table 2, when the discharging times of the lithium primary batteries according to Example 1 and Comparative Examples 1 and 2 were compared, the lithium primary battery of Example 1 showed stage-wise voltage characteristics, and thus the battery usage may be checked along with improvement in a low temperature performance, which is a disadvantage of a lithium sulfonyl (Li/$SO_2Cl_2$) battery, and high efficiency characteristics, which are disadvantages of the lithium thionyl (Li/$SOCl_2$) battery.

Figure 3:
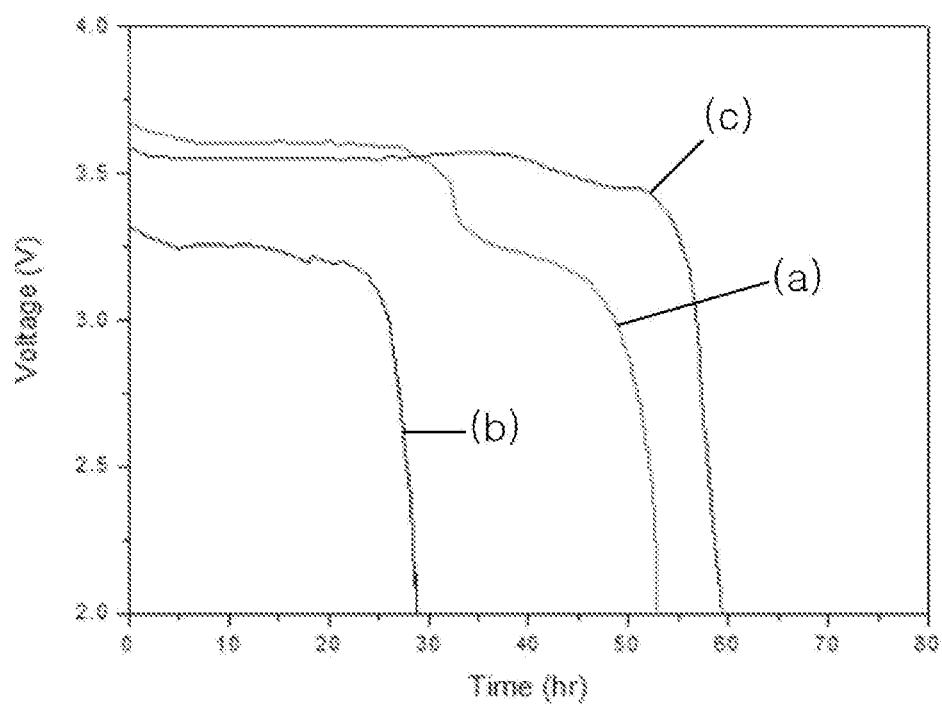
FIG. 3 is a view representing the results of discharging characteristic tests performed on the batteries prepared according to Example 1 and Comparative Examples 1 and 2 under the conditions including 20° C. and a current at an intensity of 5 mA/cm$^2$.

However, FIG. 3 is a view representing the results of discharging characteristic tests performed on the batteries prepared according to Example 1 and Comparative Examples 1 and 2 under the conditions including 20° C. and a current at an intensity of 5 mA/cm². Here, in order to compare battery performance at a high current, the results show discharging characteristic tests performed with a current at an intensity of 5 mA/cm², that is about 5 times higher than the test condition of FIG. 2.

As shown in FIG. 3, the battery of Example 1 exhibited two stage discharging characteristics due to using the composite electrolyte of 70% of $SO_2Cl_2$+30% of $SOCl_2$, and thus the discharging process was confirmed.

Here, when compared with Comparative Example 1 using the electrolyte of 100% of $SOCl_2$, the discharging time of the lithium primary battery according to Example 1 exhibited a capacity at about 190% level, which implied improvement in high efficiency characteristics, which are disadvantages of the lithium thionyl (Li/$SOCl_2$) battery, and when compared with Comparative Example 2 using the electrolyte of 100% of $SO_2Cl_2$, the lithium primary battery according to Example 1 exhibited a capacity at 95% level.

Figure 4:
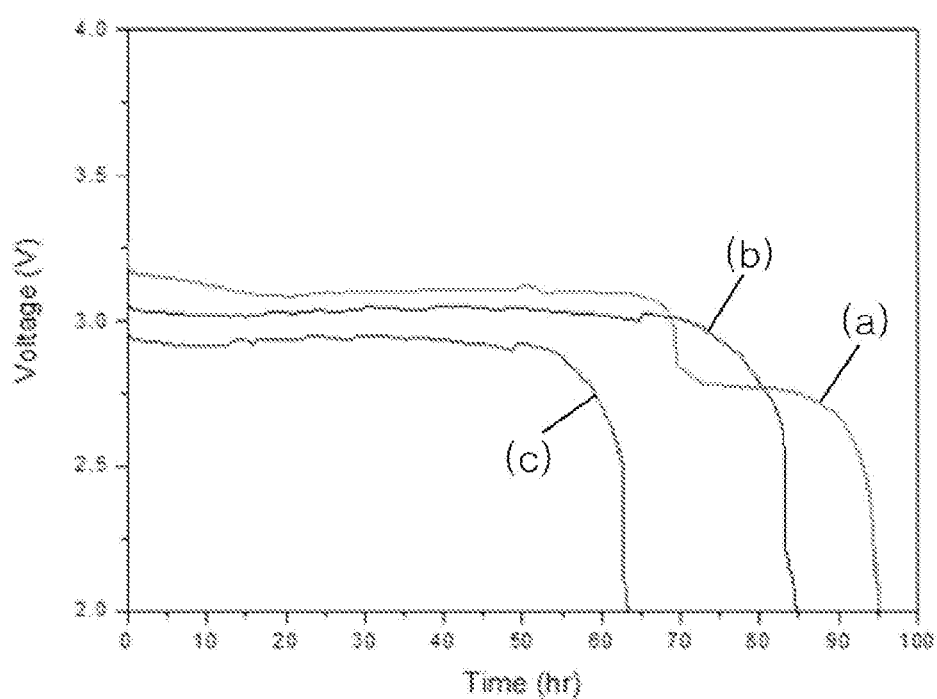
FIG. 4 is a view representing the results of discharging characteristic tests performed on the batteries prepared according to Example 1 and Comparative Examples 1 and 2 under the conditions including −30° C. and a current at an intensity of 1 mA/cm$^2$.

Also, FIG. 4 is a view representing the results of discharging characteristic tests performed on the batteries prepared according to Example 1 and Comparative Examples 1 and 2 under the conditions including −30° C. and a current at an intensity of 1 mA/cm². Here, in order to compare battery performances at a low temperature, FIG. 4 shows the results of discharging characteristic tests performed at −30° C. and by supplying a current at an intensity of 1 mA/cm².

As shown in FIG. 4, the lithium primary battery according to Example 1 using the composite electrolyte having a composition of 70% of $SO_2Cl_2$+30% of $SOCl_2$ was discharged while exhibiting two stage voltage characteristics as in the case of FIG. 3. Also, when compared with the lithium thionyl (Li/$SOCl_2$) battery according to Comparative Example 1 using the electrolyte of 100% of $SOCl_2$, the discharging time of the lithium primary battery according to Example 1 exhibited a capacity at about 110% level, and, when compared with the lithium sulfonyl (Li/$SO_2Cl_2$) battery using the electrolyte of 100% of $SO_2Cl_2$, the discharging time of the lithium primary battery according to Example 1 exhibited a capacity at about 150% level. Thus, improvement in low temperature characteristics, which are disadvantages of the lithium sulfonyl (Li/$SO_2Cl_2$) battery, was confirmed.

Although the invention has been described and illustrated in the foregoing exemplary embodiments, it is understood that the present disclosure has been made only by way of example, and that numerous changes or modifications may be made without departing from the spirit and scope of the present invention. The present invention is thus limited only by the following claims.

The invention claimed is:

1. A lithium primary battery using a composite electrolyte, wherein the lithium primary battery has a bobbin shape and comprises:
   a lithium anode comprising a metal lithium;
   a cathode comprising a carbon powder; and
   the composite electrolyte that is contained in a battery case,
   wherein the composite electrolyte is prepared by mixing a sulfonyl ($SO_2Cl_2$) electrolyte and a thionyl ($SOCl_2$) electrolyte, and a weight ratio of the sulfonyl ($SO_2Cl_2$)

electrolyte to the thionyl (SOCl$_2$) electrolyte in the composite electrolyte ranges from 6:4 to 9:1, wherein the lithium primary battery is characterized in having two stage discharging voltages, which are a battery voltage maintained at 3.8V±0.2V by the sulfonyl (SO$_2$Cl$_2$) electrolyte during an initial operation and then a battery voltage maintained at 3.5V±0.2V by the thionyl (SOCl$_2$) electrolyte, to make it possible to check a remaining capacity of the battery in use.

2. A lithium primary battery using a composite electrolyte, wherein the lithium primary battery has a spiral shape and comprises:

a lithium anode comprising a metal lithium;

a cathode comprising a carbon powder; and the composite electrolyte that is contained in a battery case, wherein the composite electrolyte is prepared by mixing a sulfonyl (SO$_2$Cl$_2$) electrolyte and a thionyl (SOCl$_2$) electrolyte, and a weight ratio of the sulfonyl (SO$_2$Cl$_2$) electrolyte to the thionyl (SOCl$_2$) electrolyte in the composite electrolyte ranges from 6:4 to 9:1, wherein the lithium primary battery is characterized in having two stage discharging voltages, which are a battery voltage maintained at 3.8V±0.2V by the sulfonyl (SO$_2$Cl$_2$) electrolyte during an initial operation and then a battery voltage maintained at 3.5V±0.2V by the thionyl (SOCl$_2$) electrolyte, to make it possible to check a remaining capacity of the battery in use.

3. The lithium primary battery of claim 2, wherein the composite electrolyte is prepared by mixing the sulfonyl (SO$_2$Cl$_2$) electrolyte and the thionyl (SOCl$_2$) electrolyte at a weight ratio ranging from 6:4 to 7:3.

4. The lithium primary battery of claim 2, wherein a lithium salt in the composite electrolyte is at least one lithium salt selected from a lithium aluminum chloride (LiAlCl$_4$) and a lithium gallium chloride (LiGaCl$_4$), wherein a concentration of the lithium salt ranges from 0.1 M to 3.0 M.

5. The lithium primary battery of claim 2, wherein the composite electrolyte is prepared by directly adding the thionyl (SOCl$_2$) electrolyte to the sulfonyl (SO$_2$Cl$_2$) electrolyte or directly adding the sulfonyl (SO$_2$Cl$_2$) electrolyte to the thionyl (SOCl$_2$) electrolyte.

6. The lithium primary battery of claim 1, wherein the composite electrolyte is prepared by mixing the sulfonyl (SO$_2$Cl$_2$) electrolyte and the thionyl (SOCl$_2$) electrolyte at a weight ratio ranging from 6:4 to 7:3.

7. The lithium primary battery of claim 1, wherein a lithium salt in the composite electrolyte is at least one lithium salt selected from a lithium aluminum chloride (LiAlCl$_4$) and a lithium gallium chloride (LiGaCl$_4$), wherein a concentration of the lithium salt ranges from 0.1 M to 3.0 M.

8. The lithium primary battery of claim 1, wherein the composite electrolyte is prepared by directly adding the thionyl (SOCl$_2$) electrolyte to the sulfonyl (SO$_2$Cl$_2$) electrolyte or directly adding the sulfonyl (SO$_2$Cl$_2$) electrolyte to the thionyl (SOCl$_2$) electrolyte.

* * * * *